March 3, 1970  MINORU OKADA  3,497,933
INDEXABLE CUTTER INSERT AND MILLING CUTTER HEAD THEREFOR
Filed April 19, 1967  5 Sheets-Sheet 1

INVENTOR.
*MINORU OKADA*
BY
*CAROTHERS & CAROTHERS*
*HIS ATTORNEYS*

INVENTOR.
MINORU OKADA
BY
CAROTHERS & CAROTHERS
HIS ATTORNEYS

United States Patent Office 3,497,933
Patented Mar. 3, 1970

3,497,933
INDEXABLE CUTTER INSERT AND MILLING CUTTER HEAD THEREFOR
Minoru Okada, Itami-shi, Japan, assignor to Sumitomo Electric Industries, Ltd., Osaka, Japan, a corporation of Japan
Filed Apr. 19, 1967, Ser. No. 632,066
Claims priority, application Japan, Apr. 20, 1966, 41/25,389
Int. Cl. B26d 1/12
U.S. Cl. 29—95                                                    8 Claims

ABSTRACT OF THE DISCLOSURE

An indexable and reversible symmetrical cutter insert of polygonal shape having two polygonal parallel faces each of which have an even number of trapezoidal shaped identical sides, one-half of which form with each of the faces, respectively, a cutting edge less than ninety degrees in angular extent. Grooves may be provided in each of the faces each of which extends into one of the trapezoidal sides forming a cutting edge with a corresponding insert face to provide each of the cutting edges, so formed, with a cross-sectional contour corresponding to that of the groove. A chamfered surface may be formed on each edge defined by the juncture of each trapezoidal side with an adjacent trapezoidal side to increase the strength of the cutting edge.

---

A milling cutter head in combination with the throw away indexable and reversible cutter insert comprising a radially tapered cotter plate and a locator to be clamped together in each of a plurality of slots provided on the peripheral annular surface of the head, each tapered cotter plate being adapted to be radially inwardly positioned within a slot so as to secure the contiguous locator in position in the same slot. The locator is adapted to accurately position the insert relative to cutting body with means to fixedly secure the insert in its proper position relative to the locator.

BACKGROUND OF THE INVENTION

The present invention relates to a throw away cutter and more particularly to a throw away indexable and reversible cutter element or insert to be used in a milling cutter head. The present invention also relates to a milling cutter head conveniently and efficiently used together with the throw away inserts.

Recently cutters for use with face milling machines have been changing from inserted tooth cutters to throw away cutters in which throw away inserts are adapted to be mechanically detachably secured to the cutter head.

It is well known that factors relating to the various angles of a cutting edge of the insert have close relationship to the cutting performance and the life of the cutter. Representative combinations of angles of the cutting edge can be classified in nine kinds as shown in the following table.

| Classification | Radial rake | Axial rake | Number of corners useful in square shaped tip |
|---|---|---|---|
| a | + | + | |
| b | + | 0 | |
| c | + | − | |
| d | 0 | + | Four corners. |
| e | 0 | 0 | |
| f | 0 | − | |
| g | − | + | |
| h | − | 0 | |
| i | − | − | Eight corners. |

Each of said nine kinds of the combinations of angles of the cutting edge has some advantages and, at the same time, some short points; therefore, each of the combinations of angles of the cutting edge is used in various applications depending upon its advantageous features. For example, the so-called double negative inserts suffer poor cutting performance but are economical, because each of all the edges in both right angled surfaces of the insert can be used as a cutting edge. The so-called double positive inserts have good cutting performance but are not economical, because edges on only one side surface of the insert can be used as cutting edges. The so-called shear-clear tips are not economical because edges on only one side surface of the insert can be used as cutting edges, but have good characteristics in removing the cut chips.

SUMMARY OF THE INVENTION

An object of the present invention is to provide a novel throw away indexable and reversible insert which avoids the aforementioned weak points of the prior art throw away inserts.

Another object of the present invention is to provide a novel throw away insert which has good characteristics in removing cut chips and is economical by virtue of the fact that all the edges on both surfaces of the insert can be used as cutting edges.

A further object of the present invention is to provide a throw away insert of the kind described above which has good cutting performance.

Another object of the present invention is to provide a milling cutter head incorporating the aforementioned throw away inserts which is efficient in replacing and setting of the inserts accurately in positions in the cutter head.

The above objects are achieved by providing a positive relief angle at one side surface of each of the corners of the insert of substantially polygonal shape while a negative relief angle is given at the opposite side surface of the corner so as to effect substantially symmetrical configuration of each of the corners with respect to the center of the insert. By forming the insert as stated above, all the corners on both surfaces of the insert can be used as cutting edges thereby affording economy in operation while the insert maintains good characteristics for removing the cut chips.

The present invention also provides a cutter head conveniently and efficiently used together with the throw away inserts by providing a radially tapered cotter plate and a locator to be received together in each of the slots provided in the peripheral side surface of the cutter head, said locator being fixedly secured in position in the slot by radially inwardly forcing the cotter, said locator being provided with a cut out portion for snugly receiving a portion of the insert so as to locate the tip in accurate position relative to the locator, said insert being fixedly secured in said accurate position by urging a clamp provided with tapered surface substantially radially inwardly so as to effect depressing force against the insert by the tapered surface of the clamp thereby firmly clamping the insert between the clamp and the cotter. This construction of the cutter head affords efficient operation of the head while it permits accurate positioning of the inserts.

BRIEF DESCRIPTION OF THE DRAWINGS

FIGS. 3a and 3b are views showing the embodiments of the throw away inserts in accordance with the present invention, respectively, FIG. 3 showing the insert without positive grooves, while FIG. 3b shows the insert provided with positive grooves so as to improve the cutting performance.

DESCRIPTION OF THE PREFERRED EMBODIMENTS

Now a description of the preferred embodiments of the present invention will be set forth hereinafter in connection with the prior art throw away inserts.

The throw away insert in accordance with the present invention can be used under the conditions of the combinations of angles of the cutting edge of the insert as follows:

| Classification | Radial rake | Axial rake | Number of corners usable in square tip |
|---|---|---|---|
| a | + | + | |
| b | + | 0 | |
| c | + | − | |
| d | 0 | + | Eight corners. |
| e | 0 | 0 | |
| f | 0 | − | |
| g | − | + | |
| h | − | 0 | |

Figures 2A, 2B, 2C:
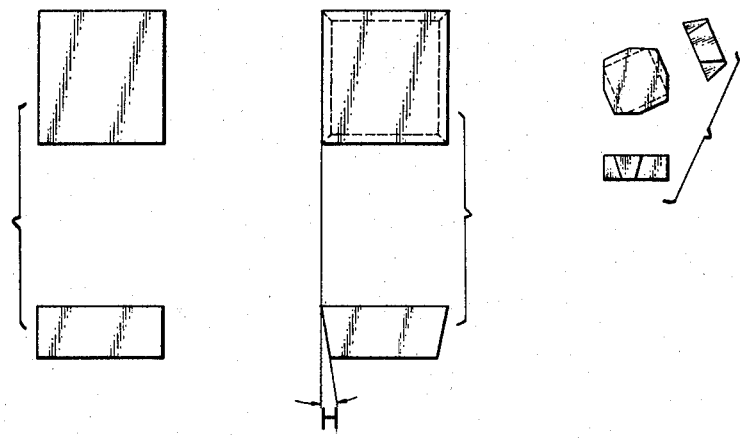
FIGS. 2a, 2b and 2c are views showing prior art throw away inserts, respectively, FIG. 2a showing so-called double negative insert, FIG. 2b showing so-called double positive insert, and FIG. 2c showing so-called shear-clear insert.

The prior art double negative throw away inserts as shown in FIG. 2a are used under the condition of angles of the cutting edge as referred to in item (i) in the first aforementioned table, i.e. under the condition that both the radial rake angle and axial rake angle are negative, and they are economical in that all the corners on both surfaces of the insert can be used as cutting edges; however, they suffer poor cutting performance, because both the rake angles are negative. The prior art double positive throw away inserts as shown in FIG. 2b are used under the conditions of angles of cutting edge as referred to in items (a), (b), (c), (d), (e), (f), (g) and (h) in the first aforementioned table, and they have good cutting performance. However, they are disadvantageous in that the corners on only one side surface of the insert can be used as cutting edges. Also, the prior art shear clear throw away inserts as shown in FIG. 2c have good characteristics for removing cut chips, but they are disadvantageous in that the corners on only one side surface of the insert can be used as cutting edges.

The throw away insert in accordance with the present invention is used under the conditions of angles of cutting edges as referred to in items (a), (b), (c), (d), (e), (f), (g) and (h) in the second aforementioned table, and is characterized in that all the corners on both side surfaces of the insert can be used as cutting edges, while the insert maintains good characteristics for removing cut chips. In other words, the throw away insert in accordance with the present invention is an improvement in the prior art shear clear throw away insert as shown in FIG. 2c by making it possible to use the corners on both side surfaces of the insert as cutting edges.

Figures 3A, 3B:
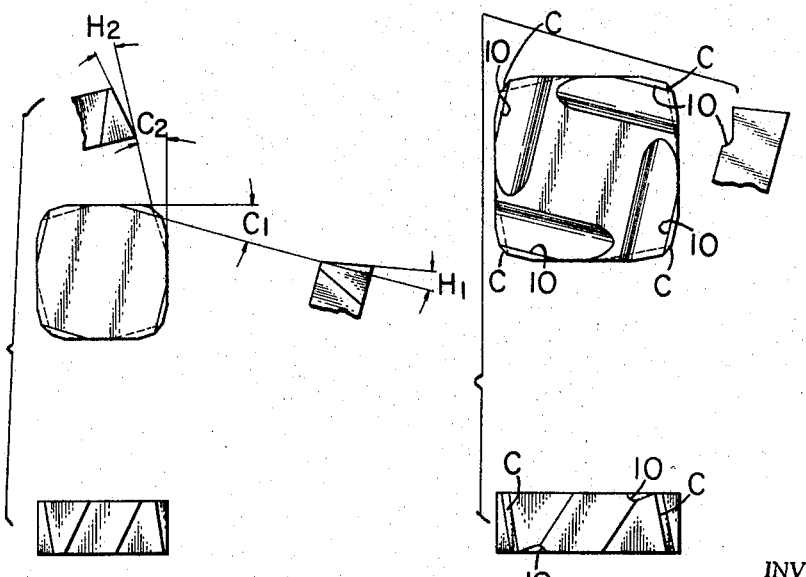
Figure 5A:
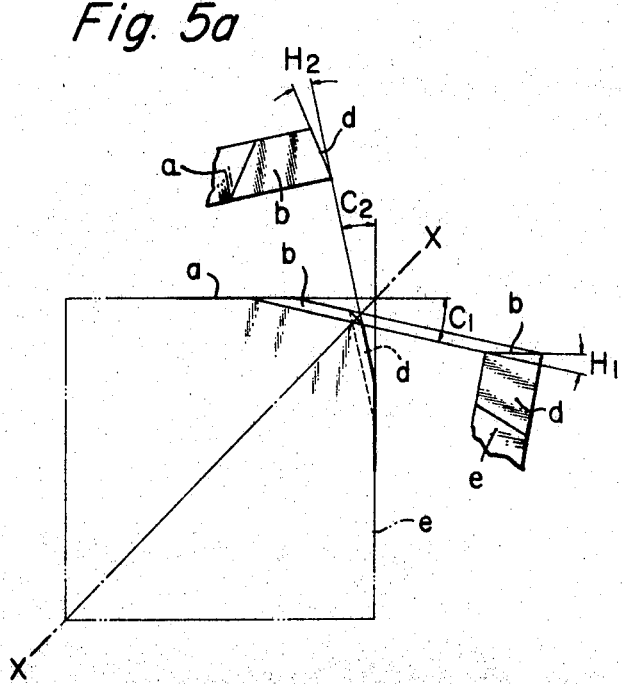
FIG. 5a is a view showing in detail the configuration of the cutting edge of one embodiment of the insert in accordance with the present invention.
Figure 5B:
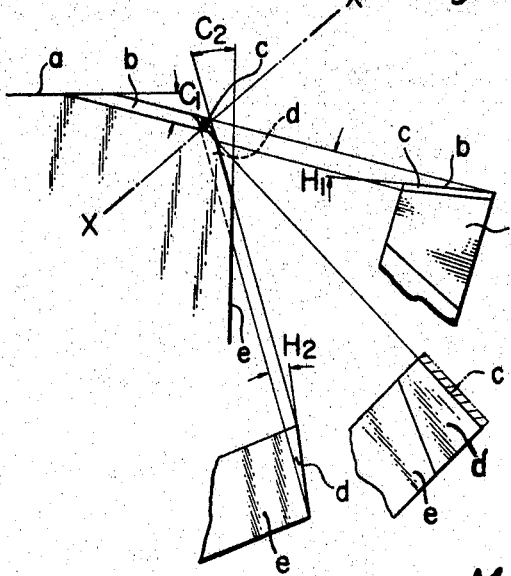
FIG. 5b is a view showing in detail the configuration of another embodiment of the insert in accordance with the present invention.

The detailed configuration of the throw away insert in accordance with the present invention and the cutting edges thereof are illustrated in FIG. 3a, 3b, 5a and 5b. FIG. 3a shows a typical configuration of the insert while FIG. 3b shows a modification of the insert shown in FIG. 3a in which positive grooves 10 are provided in the surfaces of the insert along the cutting edge so as to improve the cutting performance. FIG. 5a shows a typical configuration of the cutting edge, while FIG. 5b shows a modification of the cutting edge in which chamfering surface c is provided at each of the corners of the insert. The cutting edge shown in FIGS. 5a and 5b is shaped substantially symmetrically with respect to the bisector X—X which is taken in the middle plane between both surfaces of the insert parallel thereto and intersects the corner of the insert as illustrated. Positive relief angle $H_1$ is provided on one side surface b of the edge in the direction at angle $C_1$ with respect to peripheral side surface a, while negative relief angle $H_2$ is given on the other peripheral side surface d of the edge in the direction at angle $C_2$ with respect to the other peripheral side surface e. A chamfering surface c may be provided at the intersecting line of surface b and d as shown in FIG. 5b, so that the strength of the cutting edge is increased.

The aforementioned configuration of the cutting edge in accordance with the present invention makes it possible to use all the corners on both side surfaces of the insert while it maintains good characteristics for removing cut chips. Further, better cutting performance can be obtained when positive grooves are provided in the surfaces of the insert along each of the cutting edges of the insert as set forth in detail hereinbelow.

Figure 4:
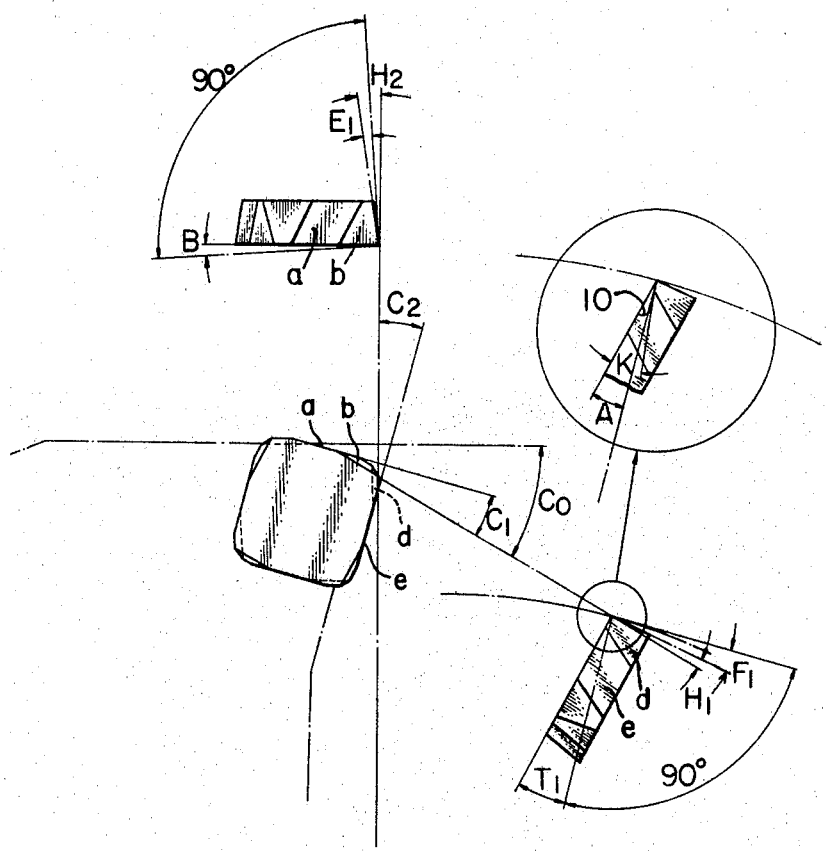
FIG. 4 is a view showing in detail the cutting edge portion of the throw away insert in accordance with the present invention.

Referring now to FIGS. 4, 5a and 5b, the detailed construction of the cutting edge of the insert in accordance with the present invention will be described below.

Figure 1A:
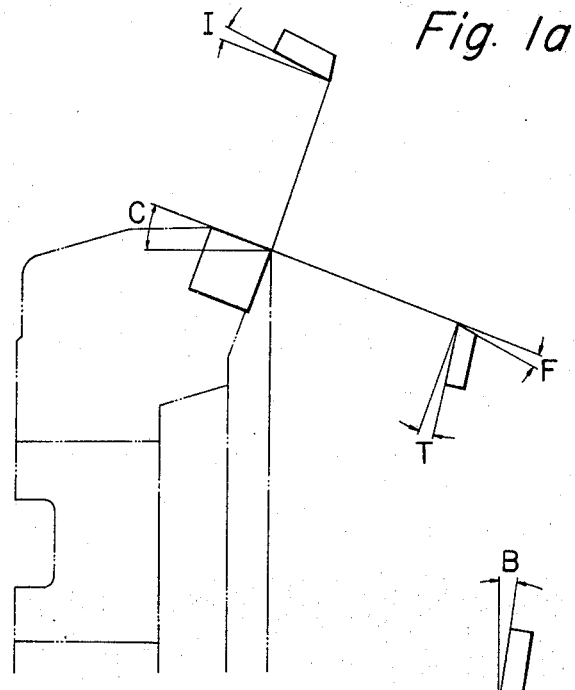
FIGS. 1a and 1b are views diagrammatically showing the relationship of various angles relating to the cutting edge of a throw away insert in axial and radial cross section, respectively, in reference to the cutter head.
Figure 1B:
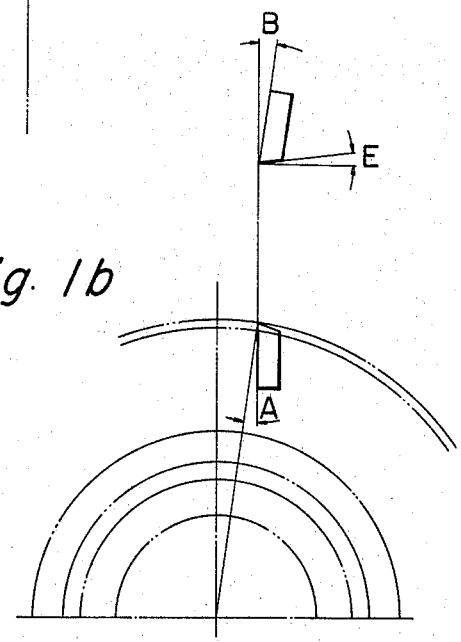

The various angles relating to the cutting edge of the insert are identified as follows in connection with the drawings, particularly with reference to FIGS. 1a and 1b:

A = radial rake angle
B = axial rake angle
C = corner angle
I = bevel angle of the cutting edge
E = face relief angle
F = main relief angle
T = true rake angle The relationship between the above various angles of the cutting edge is given by the following formulas:

$$T = \tan^{-1}(\sin C \tan A + \cos C \tan B)$$

$$I = \tan^{-1}(\cos C \tan A - \sin C \tan B)$$

From the nature of the cutter insert, it requires $$E > 0$$
$$F > 0$$

Usually the values of E and F are selected as follows:

$$3° < E$$
$$3° < F$$

Now the relationship between A, B, C, T and I is discussed with the ranges of E and F being selected as above under the consideration of various applications of the insert in accordance with the second aforementioned table.

FIG. 4 shows the configuration of the insert wherein the value of B is selected to be positive while the value of A is selected to be negative. By selecting appropriate corner angle Co, $T_1$ is expessed as follows:

$$T_1 = \tan^{-1}(\sin Co \tan A + \cos Co \tan B)$$

By giving a relief angle $H_1$ to beveled surface b located at angle $C_1$ with respect to peripheral side surface a, main relief angle $F_1$ is given by the following formula:

$$F_1 = T_1 - H_1$$

When a relief angle $H_2$ is given to beveled surface as shown in FIGS. 4, 5a and 5b, face relief angle $E_1$ is given as follows:

$$E_1 = H_2 - B$$

This gives the condition of angles (g) as referred to in the second aforementioned table.

If positive groove K is provided along the cutting edge of the insert as shown in FIGS. 3b and 4 so as to obtain the following condition:

$$A = 0$$

then the condition of angles (d) is given.

Further, if the value of A is selected to be $A > 0$, then the condition of angles (a) is obtained.

Since similar conditions are obtained by selecting the value of B to be $B = 0$ instead of A, the conditions of angle (b), (e) and (h) can be obtained.

In case the value of B is selected to be negative while the value A is positive, the results are contrary to those in which the value of B is selected to be positive and the value of A is selected to be negative, therefore, the condition of angles (c) is obtained.

Now considering the throw away insert in accordance with the present invention is turned upside down or end for end, then the aforementioned angles $C_2$ and $H_2$ are presented instead of $C_1$ and $H_1$, respectively. In the case where $C_1 = C_2$, $H_1 = H_2$, then the insert may be set automatically at the same position in the cutting head as in the case where the insert has not been turned upside down to present the rear side of the insert instead of the front.

It must be noted that, in the present invention, it is not necessarily required to make the angles $C_2$ and $H_2$ have the same values of angles $C_1$ and $H_1$, respectively. In any case, the throw away insert in accordance with the present invention has the characteristic feature that all the corners of both side surfaces of the insert can be used as cutting edges under the conditions of angles of cutting edges as referred to in items (a), (b), (c), (d), (e), (f), (g) and (h) in the second aforementioned table. Therefore, if the throw away insert is shaped in square form, eight corners acn be used as cutting edges.

The throw away insert in accordance with the present invention has positive relief angle $H_1$ in the direction at angle $C_1$ with respect to one peripheral side surface $a$ of the insert, while it has negative relief angle $H_2$ in the direction of angle $C_2$ with respect to the other peripheral side surface $e$ of the insert as described above, and a chamfering surface $c$ may be provided at the corner line of the insert as shown in FIG. 5b in order to increase the strength of the cutting edge. Further, positive grooves 10 may be formed in the surfaces of the insert as shown in FIG. 3b in order to give good cutting performance of the cutting edges of the insert.

It must be understood that, though the embodiments of the present invention shown are square in shape, the shape of the insert may be made in any polygonal shape having at least three peripheral sides within the scope of the present invention.

Figure 6:
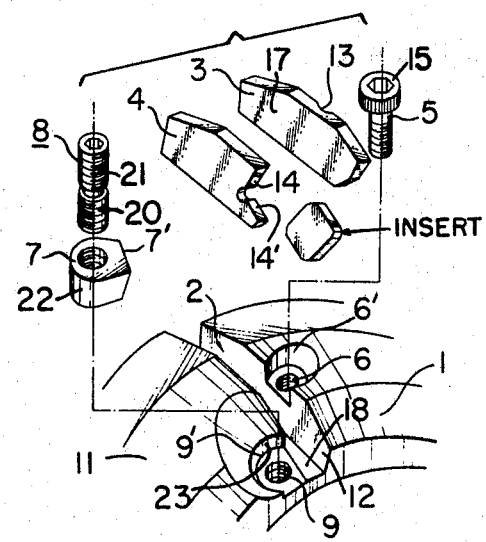
FIG. 6 is an exploded view showing the relationship in mounting the insert in a cutter head in accordance with the present invention, the cutter head being shown in part.
Figure 7:
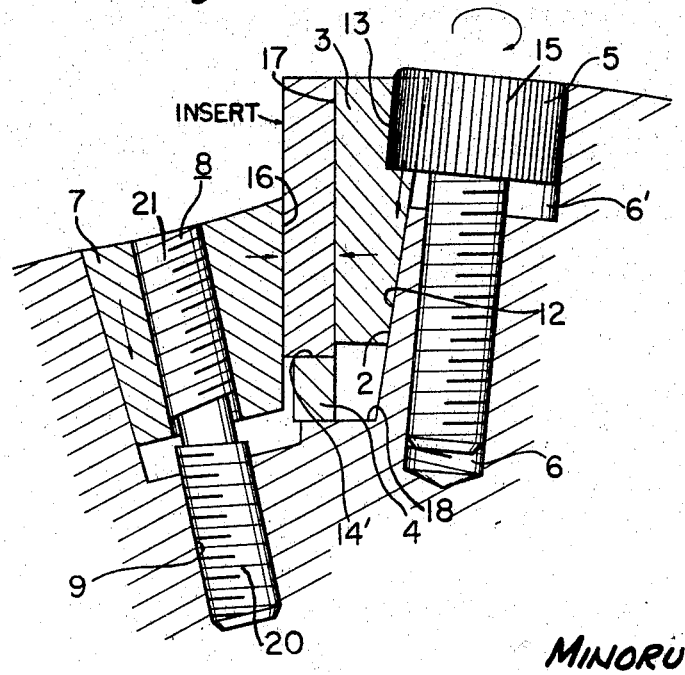
FIG. 7 is a cross-sectional view showing the relationship between various elements of the cutter head shown in FIG. 6 when the insert is clamped in position in the cutter head.

How the cutter head in accordance with the present invention which is adapted to conveniently and efficiently mount the throw away inserts described above will be set forth below. As illustrated in FIGS. 6 and 7, the cutter head comprises body 1 similar in shape to the conventional face milling cutter head which can be secured on the spindle of the well known milling machines. A plurality of slots 2 substantially parallel to the axis of head 1 are provided in the circumferential surface 11 of head 1 in spaced relationship to each other. Cotter 3 and locator 4 are fitted in each of slots 2 in contacting relationship with each other as shown in FIG. 7. Cotter 3 has a taper in cross section perpendicular to the axis of head 1 so that the radially outer side thereof has greater thickness than the inner side of the cotter and, thus, has a trapezoidal cross-section. Cotter 3 has a radial recess 13 in its one surface adapted to abut the wall 12 of slot 2, said recess 13 being adapted to receive a portion of setting screw 5 which in turn is adapted to be threaded into threaded hole 6 having enlarged portion 6' to receive the screw head 15; said hole 6 being provided in the circumferential surface of body 1 adjacent to slot 2 as shown in FIGS. 6 and 7. When setting screw 5 is threadedly forced into threaded hole 6, the head of setting screw 5 urges cotter 3 radially inwardly in slot 2 by virtue of the engagement of a portion of the head 15 of setting screw 5 against the base of the recess 13 of cotter 3, so that cotter 3 firmly secures locator 4 in position between the wall 16 of slot 2 and the surface 17 of cotter 3 by virtue of the tapered cross sectional configuration of cotter 3. Sufficient clearance is given between the inner side surface 17 of cotter 3 and the bottom surface 18 of slot 2 in order to assure firm fixing of the locator 4 in position by urging cotter 3 radially inwardly upon turning the setting screw 5. Locator 4 has a cut out portion forming the surfaces 14, 14' as shown in FIG. 6. The angle between surface 14 and surface 14' is selected so as to snugly receive the throw away insert in order that the insert is accurately located in position relative to the locator 4. Threaded hole 9 having tapered enlarged recess 9' is provided adjacent to slot 2 at the side thereof opposite the side where threaded hole 6 is provided as shown in FIG. 6. The axis of said hole 9 is slightly inclined with respect to the surface of locator 4 so that bolt 8 approaches locator 4 as bolt 8 is threaded radially inwardly into said threaded hole 9, as shown in FIG. 7. The bolt 8 has a threaded portion 20 adapted to be threaded into threaded hole 9. Bolt 8 has the opposite handed thread on the upper portion 21 thereof opposite to the portion 20 which is adapted to be threaded into the threaded hole 9, that is, the bolt is similar to a screw of a turn buckle construction. Clamp 7 is adapted to threadedly fit with said opposite handed thread portion 21 of bolt 8 and has circumferential surface 22 which is adapted to snugly engage with the inner surface 23 of said enlarged recess 9'. Clamp 7 has also a flat surface 7' on the periphery thereof which is adapted to face against the surface of the insert in parallel relationship thereto when the insert is located in position in the cut out portion formed by surfaces 14, 14' of locator 4.

When clamp 7 is located in said enlarged recess 9' with bolt 8 threadedly fit with both clamp 7 and threaded hole 9 and with flat surface 7' facing against the insert located in position in the cut out portion formed by surfaces 14, 14' of locator 4, the tip can be firmly secured in position by turning bolt 8 so as to urge clamp 7 radially inwardly of the head so that flat surface 7' urges the insert against the surface 17 of cotter 3 by virtue of the inclination of the axis of bolt 8 with respect to the surface of locator 4 thereby firmly securing the insert between flat surface 7' of clamp 7 and the surface 17 of cotter 3.

It is evident that the position of threaded hole 9 axially of the head along slot 2 is determined so that most effect clamping force of the insert may be obtained by urging clamp 7 radially inwardly by turning bolt 8.

Detachment of the insert is effected by turning bolt 8 in the opposite direction to loosen clamp 7 from the insert.

The construction of the cutter head described above has the following advantages:

(1) The insert can be firmly secured in accurate position easily and smoothly by merely turning the bolt to move the clamp against the insert, (2) The accuracy of positioning of the insert is high thereby dispensing with the correction of positioning of the individual inserts facilitating the operation without troublesome handling, (3) Positioning surfaces of the locator have high durability, (4) In case breakage of the insert occurs, the damage is limited to the broken insert and no part of the head is damaged, (5) Full utilization of the insert can be assured depending upon its size, because the cut chip pocket is made sufficiently large.

The present invention is described thus far referring to several embodiments thereof in connection with the drawings. It must be understood, however, that the present invention is not limited to the embodiments described and illustrated herein but broadly covers all the variations and modifications without departing from the spirit and the scope of the present invention defined in the appended claims.

I claim:

1. An indexable and reversible symmetrical cutter insert having two polygonal parallel faces, said faces having an even number of plane trapezoidal shaped identical sides, each said trapezoidal side forming in conjunction with one adjacent trapezoidal side and said polygonal parallel faces a pair of cutting tips, each of said faces forming with each of one-half said number of said trapezoidal sides an obtuse cutting edge extending from one of said tips, characterized by a plurality of grooves in each of said polygonal parallel faces for each of said obtuse cutting edges and extending adjacent to but mating with each of said obtuse cutting edges to impart therealong a resultant acute cutting edge.

2. The indexable and reversible symmetrical cutter insert of claim 1 characterized by being of general quadri-form shape.

3. The indexable and reversible symmetrical cutter insert of claim 1 characterized by a chamfered surface on each edge formed along the juncture of said adjacent trapezoidal sides to increase the strength of said cutting edges.

4. The indexable and reversible symmetrical cutter insert of claim 3 characterized by being of general quadri-form shape.

5. An indexable and reversible symmetrical cutter insert having two polygonal parallel faces, said faces having an even number of plane trapezoidal shaped identical sides, each said trapezoidal side forming in conjunction with one adjacent trapezoidal side and said polygonal parallel faces a pair of cutting tips, each of said faces forming with each of one-half said number of said trapezoidal sides a cutting edge greater than ninety degrees and extending from one of said tips, characterized by a chamfered surface on each edge formed along the juncture of said adjacent trapezoidal sides to increase the strength of said cutting edges.

6. An indexable and reversible symmetrical cutter insert having two opposed polygonal faces with adjoining plane trapezoidal shaped sides, at least one pair of cutting tips on said insert formed by said faces and two adjacent of said sides, one of said two adjacent sides adjoining one of said faces at an angle of greater than 90° and the other of said two adjacent sides adjoining the other of said faces at an angle of greater than 90° to provide two obtuse edges extending from said tips respectively, a groove extending adjacent to but mating with each of said obtuse cutting edges to form resultant acute cutting edges therealong.

7. The indexable and reversible symmetrical cutter insert of claim 6 characterized by a cutter body to receive and hold said cutter insert relative to a workpiece to be surfaced, means to move said workpiece and said cutter relative to each other, said insert positioned in said cutter body to provide a positive axial rake and a negative radial rake greater than 10°.

8. An indexable and reversible symmetrical cutter insert comprising two polygonal parallel faces, each one of said faces having plane trapezoidal shaped identical sides formed in pairs at the corners thereof, each adjacent side in a pair at the juncture with one of said polygonal parallel faces forming an obtuse-angled cutting edge oppositely disposed relative to another such cutting edge on the other adjacent side of the pair at its juncture formed with the other of said faces, said cutter insert characterized by a chamfered surface on the edge formed at the juncture of said trapezoidal sides formed in pairs to increase the strength of their cutting edges.

References Cited

UNITED STATES PATENTS

| | | | |
|---|---|---|---|
| 3,907,417 | 7/1963 | Hill | 29—96 |
| 3,137,917 | 6/1964 | Dowd | 29—95 |
| 3,187,406 | 6/1965 | Franks | 29—95 |
| 3,226,797 | 1/1966 | Hertel | 29—95 |
| 3,289,271 | 12/1966 | Stien | 29—95 |

HARRISON L. HINSON, Primary Examiner

U.S. Cl. X.R.

29—105